A. V. DIEHL.
EDUCATIONAL MAGNETIC TOY.
APPLICATION FILED MAY 15, 1916.
1,225,787.
Patented May 15, 1917.
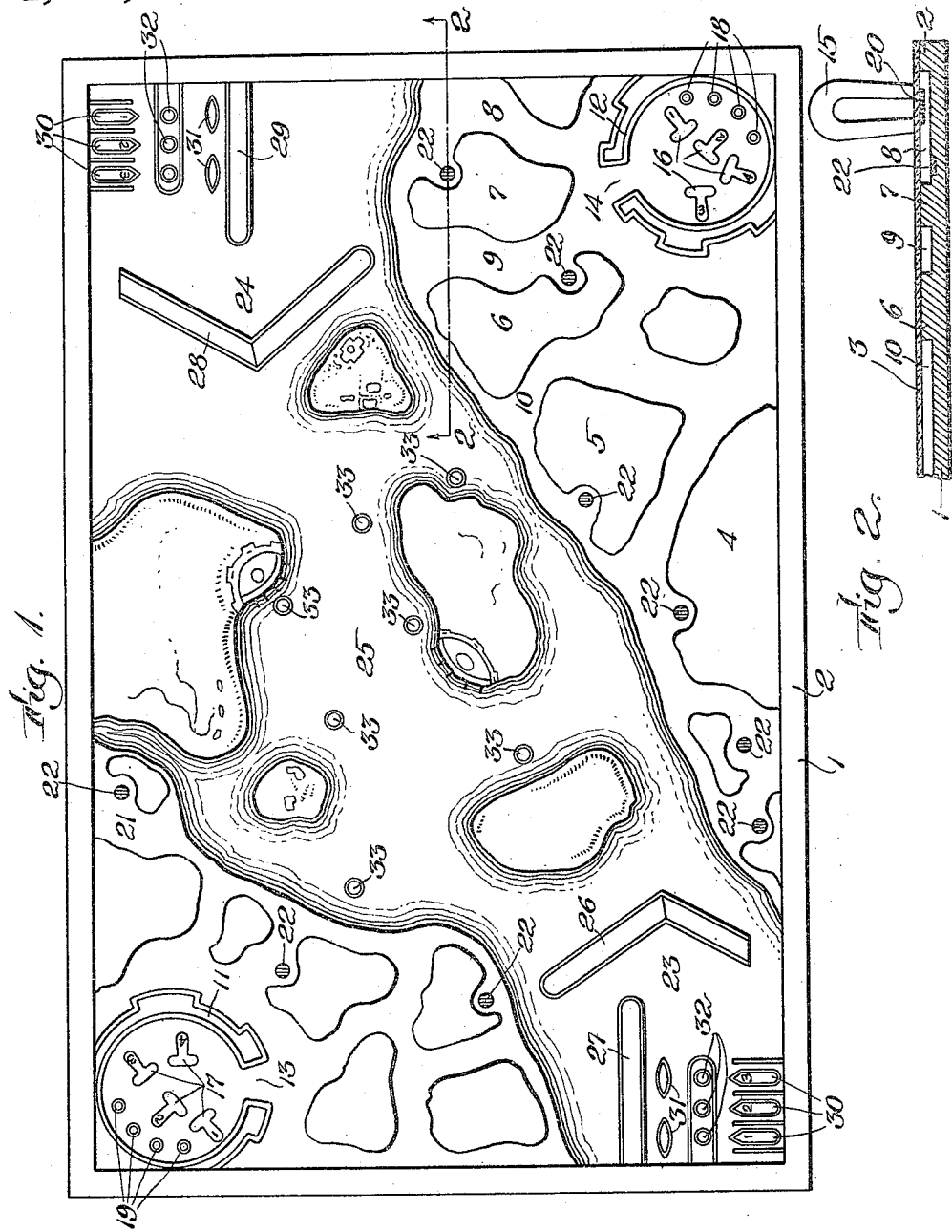

UNITED STATES PATENT OFFICE.

ARTHUR V. DIEHL, OF BUZZARDS BAY, MASSACHUSETTS.

EDUCATIONAL MAGNETIC TOY.

1,225,787.  Specification of Letters Patent.  Patented May 15, 1917.

Application filed May 15, 1916. Serial No. 97,488.

*To all whom it may concern:*

Be it known that I, ARTHUR V. DIEHL, a subject of the King of Great Britain, and resident of Buzzards Bay, Barnstable county, State of Massachusetts, have invented an Improvement in Educational Magnetic Toys, of which the following description, in connection with the accompanying drawings, is a specification, like letters on the drawings representing like parts.

My present invention relates to educational and amusement magnetic devices, and particularly to magnetic toys and as shown herein may be designated as a magnetic (aerial) war game, either aerial or marine, since a series of paramagnetic objects to represent aeroplanes, bombs, ships, submarines, or the like, are acted upon magnetically by a magnet held in the hand (or suitable handle or device) through a transparent medium such as glass, sheet mica, celluloid or the like.

A secondary feature of my invention consists in the interference with free action of the paramagnetic objects by embossed, oddly shaped raised configurations in touch with the transparent cover of the shallow container containing the paramagnetic objects, thus making the winning of the game a question of skill, ingenuity and time between the players of the game.

Another feature, quite important in the playing of the game, is a series of metal disks fastened to the face of the map or view which I have adopted in order that I may represent a section of country over which, for example, the aeroplanes are traveling, which have the tendency of overcoming the power of the magnetic induction of the bombs. The object of the game is, with the aid of the aeroplanes, to take individual bombs, each of which is numbered, to a series of metal disks representing towers, forts, etc., by utilizing inductive magnetism through the aeroplane bearing the same number which induces the paramagnetic bomb to adhere to the paramagnetic aeroplane, and there to release them, thus representing the destruction of such towers, forts, etc.

All of these objects may be lifted up to the lower surface of the glass cover, thus simulating a lifelike movement of the aerial craft, and enabling the player to move his objects with celerity in any direction.

Another feature and an important one in the playing of the game, is a series of metal plates or disks which may be of any desired shape, which are fastened to the face of the map or bird's eye view, which will have a tendency to overcome the induced magnetism passing through the metal disks representing bombs, so that the bomb is more easily relinquished in the desired position by the aeroplane, which relinquishment represents the blowing up of the fort or tower, etc.

One of the attractive features of the invention is that it is not confined to one player at a time, and a great deal of amusement may be derived by one player attempting to interfere with the paramagnetic bombs and aeroplanes of the other.

Any number of aeroplanes, ships, bombs, plates, etc., may be used to represent the force of any nation engaged in the mimic warfare.

Referring to the drawings,

Figure 1 is a plan, in bird's eye view, illustrating an idealistic section of land and water suitable to carry out my invention;

Fig. 2 is a cross sectional fragmentary view on the line 2—2 of Fig. 1.

While I have illustrated, herein, the combination of both land and water representations suitable to carry out my magnetic war game toy with aerial as well as submarine craft, it will be readily understood that I may segregate these two features in separate games or formulate others of a like nature. For the sake of illustration, however, I have shown, in the drawing, the combination of both methods of carrying out the invention.

A suitable box or container 1 is provided, having an embossed rim 2 thereabout of suitable height to hold and support the transparent cover 3. Within the container 1 I arrange a plurality of raised portions, such as 4, 5, 6, 7 and the like, to represent hills, islands, forts, break-waters, hangars, and the like, which, preferably are of the same height as the rim 2, or at least in touch with the under surface of the transparent glass cover 3 thus producing channels 8, 9, 10, etc., between the hills. Placed at convenient corners the representation of hangars 11 and 12 are provided with spaces adapted to contain the aerial craft of rival nations, which aeroplanes may be suitably colored if desired and numbered. The walls of the hangars 11 and 12 are also, preferably, in touch with the glass 3 and have openings 13 and 14 through which the aeroplanes may be conducted, through the manipulation of a magnet 15 in the hands of the operator. The series of aeroplanes designated at 16 in the hangar 12 for example, may be one color, and those designated at 17 in the hangar 11 may be differently colored, and preferably each one numbered and of a thin para-magnetic or metallic substance to respond to the magnet 15. A series of bombs 18 and 19 respectively are also of para-magnetic substance and similarly numbered and colored to coöperate with the aeroplanes operating therewith. The player with the magnet 15 manipulates the same so as to pick up one of the aeroplanes as shown in Fig. 2 at 20, then moving same over one of the bombs adjacent thereto in the hangar, which will also be attracted by the magnet and held under the aeroplane 20. The player now moves the magnet to conduct the aeroplane out of the hangar through the various channels 8, 9, 10, etc., and over to the enemy's country, his intention being to place the bombs in their respective positions and to return his aeroplanes to the hangar in less time than his opponent. Should any aeroplane be dropped inside of the space designating water, it is presumably destroyed. Should the aeroplane get caught in the channels 8 or 9, it would take some time to free it, and the better play would be to start with another. If safely carried from the hangar 12 to the enemy's country, at 21, for example, the bomb must be dropped and the aeroplane re-conducted back through the channels provided to the hangar. To facilitate the dropping of the bombs I provide metal disks as indicated at 22, at different positions, each designating a fort, city, town or the like.

Aeroplanes 16 and 17 as well as bombs 18 and 19 will be readily carried by the magnet throughout the entire extent of the map, so long as the aeroplane is freely in contact with the under surface of the glass 3 only, but should it strike against the walls of the hills 5, 6, 7, etc., it may become stuck in the channels and the flight, for the time being, stopped. The channels, therefore, may be made of sufficient intricacy to involve a high degree of skill in manipulating both the magnet 15 and the accompanying aeroplane and bomb, to successfully conduct a flight from one hangar to a destination 22 and return. Arriving over one of the points of destination 22, the magnetic induction on the bomb is largely neutralized and the bomb is therefore relinquished more readily on the member 22.

The game thus simulates the flying of an aeroplane, lifting it above the general surface of the country, and flying about through the valleys caused by the hills and islands. This particular feature simulating the actual flight of aeroplanes is believed to be a distinct novelty and I therefore wish to claim the same broadly.

A similar arrangement and game in connection with ships and submarines, hydro-aeroplanes, sea-planes, etc., is feasible. As herein shown, harbors 23 and 24 are shown at opposite portions of the representation of a body of water 25, such harbors being formed by breakwaters 26 and 27 for that designated as 23 and similar breakwaters 28 and 29 for the other harbor number 24. Such breakwaters are preferably in contact with the under surface of the glass 3 and therefore must be avoided in manipulating the toy ships 30 and submarines 31. Bombs 32, which may be carried by the ships or submarines in a corner similar to that described with the aeroplanes, are also arranged, while metallic points 33 are fitted, similar to those 22, already described, at suitable positions to enable the bombs to be readily separated from the vessel carrying them.

Suitable rules for the magnetic aerial and submarine games may be formulated. The glass 3 forming the cover of the container may be removed and the various pieces properly set in order, then the glass 3 is fitted on the carrier 1 and the players may either take turns or simultaneously manipulate their respective magnets to carry bombs into the enemy's country and seek to return safely to their starting position. So many numerous arrangements, combinations and situations may be developed in carrying out the invention that it will be unnecessary to endeavor to enumerate them herein. The principles involved are clearly indicated by the foregoing description and the accompanying drawings.

My invention is further described and defined in the form of claims as follows:

1. In a magnetic toy, a container having a transparent cover, a plurality of para-magnetic objects within the container and under said cover, a series of disks fastened to the container, a magnet adapted to be manipulated outside the cover and to lift said objects up within the container and to carry the same over said disks, whereby said objects may be released and drop on said disks which aid in neutralizing the force of inductive magnetism of the magnet.

2. In a magnetic game of the kind described, a container comprising the representation of land or water, a glass cover for said container, a plurality of raised portions of said container in touch with the cover, a plurality of metallic disks in said container, a plurality of para-magnetic objects representing aerial and similar para-magnetic objects representing bombs and adapted to be conducted with the aerial craft about the container by means of a magnet held on the outside of the glass cover, said metallic disks facilitating the neutralizing of the inductive magnetism and the separation of the bomb from an aerial craft.

In testimony whereof, I have signed my name to this specification, in the presence of two subscribing witnesses.

ARTHUR V. DIEHL.

Witnesses:
CHAS. A. FOSTER,
JENNIE DIEHL.

Copies of this patent may be obtained for five cents each, by addressing the "Commissioner of Patents, Washington, D. C."